June 6, 1961  J. MODIANO  2,987,542
MANUFACTURE OF METHYL METHACRYLATE
Filed Jan. 21, 1959

Jacques Modiano
by Webb, Mackey & Burden
Attys.

United States Patent Office 2,987,542
Patented June 6, 1961

2,987,542
MANUFACTURE OF METHYL METHACRYLATE
Jacques Modiano, Roule, la Mulatiere, France, assignor to Societe d'Electro-Chimie, d'Electro-Metallurgie et des Acieries Electriques d'Ugine, Paris, France, a corporation of France
Filed Jan. 21, 1959, Ser. No. 788,176
Claims priority, application France Mar. 11, 1958
4 Claims. (Cl. 260—486)

The present invention relates to improvements in the manufacture of methyl methacrylate.

In the usual manufacture of this ester from acetone cyanohydrin, the operation is carried out in two stages, in accordance with the successive reactions as follows:

(1) 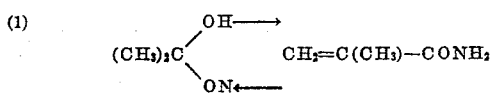

(which corresponds to the conversion of acetone-cyanohydrin to amide, in a concentrated hot sulphuric medium).

(2) 

(which corresponds to the esterification of this amide by methanol).

In accordance with this process however, in order to obtain a very high efficiency of esterification as rapidly as possible, and in order that the ester may have only a negligible content of free methacrylic acid, it is essential to operate with a large excess of methanol in the esterification stage, corresponding in general to twice or three times the stoichiometric quantity. On the other hand, in order to avoid the de-hydration of the methanol to methyl oxide, it is recommended to introduce about one mol. of water per mol. of methanol. The operation is carried out in a continuous or non-continuous manner at a temperature such that the ester which is formed is eliminated almost immediately in the form of vapors, which are however actually constituted by a mixture of methyl methacrylate, methanol and water which it is impossible to separate into its constituents by distillation, by reason of the existence of azeotropes.

Various methods have been suggested for separating the ester from this complex mixture. In accordance with one of these methods, a mixture of vapors passing out of the esterification apparatus is treated in counter-flow with hot water which dissolves the methanol without dissolving the methyl methacrylate, but this operation in the hot state has the drawback that it facilitates the polymerization of the methacrylate.

Another method consists in condensing the vapors and then treating the cooled liquid with a large quantity of water (about 150 kgs. for 100 kgs. of condensate). Depending on the type of extractor and the number of stages used, there is isolated in this way an organic phase containing 94 to 97% of ester which, after distillation, can give a pure monomer which can subsequently be polymerized.

In these known methods however, it is necessary to rectify the aqueous phase obtained, so as to recover the methyl methacrylate which it still contains, together with the methanol, which can then be recycled.

The applicants have tried to overcome these drawbacks of the methods used at the present time. The present invention rests on the unexpected discovery that the coefficient of division of the methanol, that is to say the ratio of the weights of methanol existing respectively in the aqueous phase and in the organic phase, increases considerably as the temperature is lowered; thus it is found that at $-12°$, this coefficient of division is between two and three times greater than at $20°$. The applicant has had the idea of utilizing this discovery to improve the economy of the manufacture of methyl methacrylate by using only a small quantity of water for the treatment of the condensate. It is thus possible to obtain two phases, one aqueous and the other organic, in which the aqueous phase contains the greater part of the methanol which is wholly re-cyclable without previous concentration of the methanol and in consequence without the addition of heat, and in which the organic phase contains the major portion of the ester which can be subjected directly to a fractional distillation so as to yield pure methyl methacrylate.

Under these conditions, the improvements in the manufacture of methyl methacrylate by conversion of acetone cyanohydrin to amide and by esterification of the amide by methanol, consist essentially, in accordance with the present invention, in treating the condensate of the azeotropic mixture methyl methacrylate/methanol/water given by the esterification, with a quantity of water less in weight than the weight of the condensate at a temperature less than 20°, and preferably with stirring, in order to obtain an aqueous phase containing the major portion of the methanol which is directly re-cycled, and an organic phase containing the major portion of the ester which can be subjected directly to fractional distillation in order to extract therefrom pure methyl methacrylate.

Working is preferably carried out below 10°, and with a weight of water between about 10% and 50% of the weight of the condensate.

There have been described below with reference to the accompanying drawings, various apparatus which can be used for carrying into effect the method forming the object of the invention.

Figure 1:
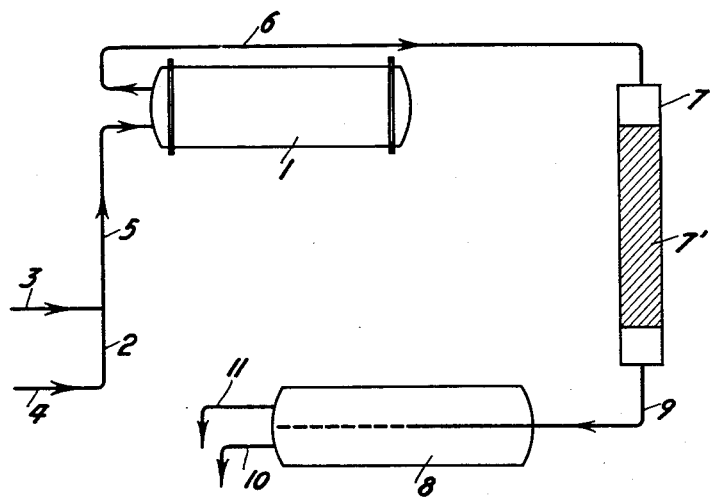
FIG. 1 is a diagrammatic view of an apparatus for carrying out the method in accordance with the invention.

As shown in FIG. 1, the apparatus comprises a cooler 1 with forced circulation, so as to avoid any separation therein of the phases; two conduit systems 3 for the water and 4 for the condensate deliver into a common mixing pipe 5, which terminates at the cooler 1. A piping system 6 connects the cooler 1 to an extraction column 7 filled with Raschig rings 7′, and suitably heat-insulated, in which the extraction is completed, and coupled by a piping system 9 to a decanter 8 having two drawing-off orifices 10 and 11 respectively for the aqueous and organic phases.

Figure 2:
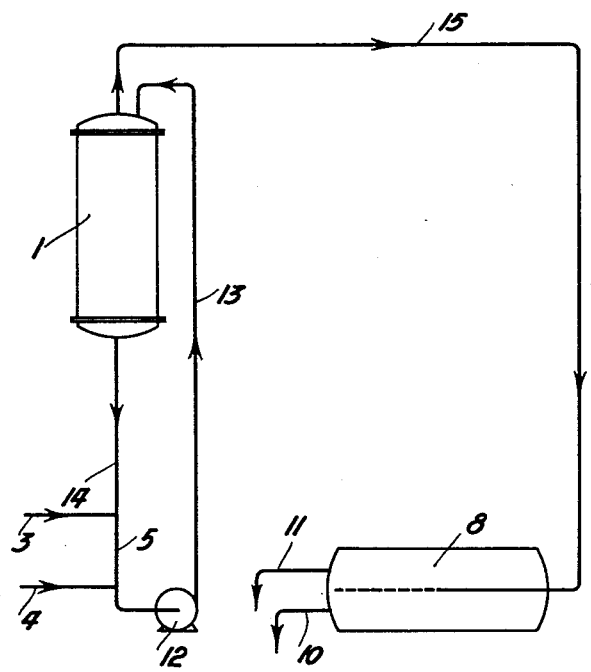
FIG. 2 is a diagrammatic view of a modified form of the apparatus.

In the alternative form of FIG. 2, there is again shown a vertical cooler 1, the conduit system 3, 4 and 5, the decanter 8 with its drawing-off orifices 10 and 11. A centrifugal pump 12 of large capacity is supplied with water and condensate which it mixes and delivers through a conduit system 13 into the cooler 1, a piping system 14 coupling the said cooler to the pump through the intermediary of the conduit system 5. The cooler 1 is coupled directly by a piping system 15 to the decanter 8.

When working in accordance with the known method, to 100 grams of a mixture containing:

| | Percent |
|---|---|
| Methyl methacrylate | 59.8 |
| Methanol | 24.5 |
| Water | 15.7 | there were added 150 grams of water (or 150% of the mixture to be treated); after stirring at 25° and decantation, there were collected 58 grams of an organic phase comprising:

| | Percent |
|---|---|
| Methyl methacrylate | 96.5 |
| Methanol | 1.7 |
| Water | 1.8 | and 192 grams of an aqueous phase comprising:

| | Percent |
|---|---|
| Methyl methacrylate | 2.2 |
| Methanol | 12.2 |
| Water | 85.6 |

The proportion of methyl methacrylate recovered in the organic phase was 93.3%.

The proportion of methanol recovered in the aqueous phase was 95.8%.

Under the known method, the separation of the methanol and the ester is thus carried out with good efficiency, but the concentration of the methanol in the aqueous phase is very low; it is therefore necessary to enrich this latter phase by distillation in order to be able to re-cycle the methanol.

In the examples given below, there have been described various forms of application of the method in accordance with the present invention.

Example 1

To 143.7 grams of a mixture containing:

| | Percent |
|---|---|
| Methyl methacrylate | 59.8 |
| Methanol | 24.5 |
| Water | 15.7 | there were added 28.7 grams of water (or 20% of the mixture to be treated).

After stirring at 20° and decantation, there were collected 93.2 grams of an organic phase comprising:

| | Percent |
|---|---|
| Methyl methacrylate | 85.4 |
| Methanol | 9.8 |
| Water | 4.8 | and 80.1 grams of an aqueous phase comprising:

| | Percent |
|---|---|
| Methyl methacrylate | 8.26 |
| Methanol | 32.8 |
| Water | 58.94 |

There was recovered in the organic phase 91.7% of methyl methacrylate; the whole quantity of the aqueous phase was sent directly into the second stage (Equation 2, esterification).

In the aqueous phase, the proportion of methanol recovered was 74.3%.

Example 2

To 121.2 grams of a mixture containing:

| | Percent |
|---|---|
| Methyl methacrylate | 59.8 |
| Methanol | 24.5 |
| Water | 15.7 | there were added 24.3 grams of water (or 20% of the mixture to be treated).

After stirring at 0° followed by a decantation, there were collected 74.2 grams of an organic phase comprising:

| | Percent |
|---|---|
| Methyl methacrylate | 90.4 |
| Methanol | 6.5 |
| Water | 3.1 | and 71.6 grams of an aqueous phase comprising:

| | Percent |
|---|---|
| Methyl methacrylate | 7.95 |
| Methanol | 34.6 |
| Water | 57.45 |

The proportion of methyl methacrylate recovered in the organic phase was 92.3% and the whole of the aqueous phase was reintroduced directly into the second stage.

The proportion of methanol recovered in the aqueous phase was 82.3%.

Example 3

To 164.3 grams of a mixture containing:

| | Percent |
|---|---|
| Methyl methacrylate | 59.8 |
| Methanol | 24.5 |
| Water | 15.7 | there were added 32.8 grams of water, or 20% of the mixture to be treated.

After stirring at −12° C. and decantation, there were collected 99.4 grams of an organic phase containing:

| | Percent |
|---|---|
| Methyl methacrylate | 93.2 |
| Methanol | 4.8 |
| Water | 1.9 | and 97.7 grams of an aqueous phase comprising:

| | Percent |
|---|---|
| Methyl methacrylate | 5.70 |
| Methanol | 36.3 |
| Water | 57.0 |

In the organic phase, 94.3% of the methyl methacrylate was recovered, and the aqueous phase was reintroduced directly and as a whole into the second stage.

The proportion of methanol recovered in the aqueous phase was 88.2%.

Example 4

To 189.6 grams of a mixture containing:

| | Percent |
|---|---|
| Methyl methacrylate | 59.8 |
| Methanol | 24.5 |
| Water | 15.7 | there were added 28.4 grams of water, or 15% of the mixture to be treated.

After stirring at −12° C. followed by a decantation, there were collected 116.1 grams of an organic phase comprising:

| | Percent |
|---|---|
| Methyl methacrylate | 91.3 |
| Methanol | 6.7 |
| Water | 2.0 | and 101.9 grams of an aqueous phase containing:

| | Percent |
|---|---|
| Methyl methacrylate | 7.41 |
| Methanol | 37.9 |
| Water | 55.69 |

From the organic phase there was recovered 93.6% of methyl methacrylate and the whole quantity of the aqueous phase was introduced directly into the second stage.

The proportion of methanol recovered from the aqueous phase was 82.9%.

Example 5

To 183 grams of a mixture containing:

| | Percent |
|---|---|
| Methyl methacrylate | 59.8 |
| Methanol | 24.5 |
| Water | 61.39 | there were added 45.7 grams of water, or 25% of the mixture to be treated.

After stirring at −12° C., followed by a decantation, there were collected 111.6 grams of an organic phase comprising:

| | Percent |
|---|---|
| Methyl methacrylate | 93.6 |
| Methanol | 4.7 |
| Water | 1.7 | and 117.1 grams of an aqueous phase containing:

| | Percent |
|---|---|
| Methyl methacrylate | 4.51 |
| Methanol | 34.1 |
| Water | 61.39 |

From the organic phase there was recovered 95.3% of methyl methacrylate, and the entire quantity of aqueous phase was reintroduced directly into the second stage.

The proportion of the methanol recovered in the aqueous phase was 88.4%.

*Example 6*

In an installation such as that shown in the drawings, there was introduced 98.3 kgs. per hour of a mixture comprising:

| | Percent |
|---|---|
| Methyl methacrylate | 58.3 |
| Methanol | 27.2 |
| Water | 14.2 |
| Methacrylic acid | 0.3 | and 18 kgs. per hour of water, or 18.3% of the mixture to be treated. The temperature of the decanter was kept at −11°. There were continuously produced 58.5 kgs. per hour of an organic phase comprising:

| | Percent |
|---|---|
| Methyl methacrylate | 90.0 |
| Methanol | 7.2 |
| Water | 2.5 |
| Methacrylic acid | 0.3 | and 57.8 kgs. per hour of an aqueous phase containing:

| | Percent |
|---|---|
| Methyl methcarylate | 8.2 |
| Methanol | 39.5 |
| Water | 52.1 |
| Methacrylic acid | 0.2 |

From the organic phase there was recovered 91.6% of the methyl methacrylate and the whole quantity of the aqueous phase was introduced directly into the second stage of the manufacture.

The proportion of methanol recovered in the aqueous phase was 85.3%.

The examples given above show with great clearness the favorable influence of the lowering of the temperature, combined with an extraction by very greatly reduced quantities of water.

What I claim is:

1. Improvements in the manufacture of methyl methacrylate by the conversion of acetone cyanohydrin to amide and esterification of the amide by methanol, the said improvements consisting essentially in: treating the condensate of the azeotropic mixture of methyl methacrylate, methanol and water coming from the esterification stage with a quantity of water of less weight than the condensate, at a temperature less than 20° C.; stirring and then decanting the said mixture in order to obtain an aqueous phase containing the greater part of the methanol, and an organic phase containing the greater part of the ester; directly recycling the said aqueous phase into the production cycle; and subjecting the said organic phase to fractional distillation, so as to extract therefrom pure methyl methacrylate.

2. A method as claimed in claim 1, in which the said treatment with water is carried out at a temperature below 10° C.

3. A method as claimed in claim 1, in which the weight of water employed for the said treatment is between 10% and 50% of the weight of the condensate.

4. A method as claimed in claim 1, in which the said treatment with water is carried out at a temperature below 0° C.

References Cited in the file of this patent

UNITED STATES PATENTS

| 2,101,821 | Crawford | Dec. 7, 1937 |
| 2,786,739 | Eck et al. | Mar. 26, 1957 |

FOREIGN PATENTS

| 1,152,406 | France | Feb. 17, 1958 |

OTHER REFERENCES

Kooi: Rec. Trav. Chim. 68, 34–42 (1949).

UNITED STATES PATENT OFFICE
CERTIFICATE OF CORRECTION

Patent No. 2,987,542                      June 6, 1961

Jacques Modiano

It is hereby certified that error appears in the above numbered patent requiring correction and that the said Letters Patent should read as corrected below.

Column 1, lines 27 and 28, the formula should appear as shown below instead of as in the patent:

$$CH_2=C(CH_3)-CONH_2 + CH_3OH \longrightarrow CH_2=C(CH_3)CO_2CH_3 + NH_3$$

column 4, line 71, in the table, opposite "Water", for "61.39" read -- 15.7 --.

Signed and sealed this 31st day of October 1961.

(SEAL)
Attest:

ERNEST W. SWIDER
Attesting Officer

DAVID L. LADD
Commissioner of Patents
USCOMM-DC